United States Patent
Skerka et al.

(10) Patent No.: US 6,915,584 B2
(45) Date of Patent: Jul. 12, 2005

(54) COMPASS WITH ELECTROMAGNETIC HALF-SHELL TRANSFORMER ENERGY TRANSMISSION AND OPTOELECTRONIC DATA SIGNAL TRANSMISSION

(75) Inventors: Wolfgang Skerka, Rendsburg (DE); Ulf Bey, Grossharrie (DE); Werner Bast, Kiel (DE)

(73) Assignee: Raytheon Marine GmbH (DE)

( * ) Notice: Subject to any disclaimer, the term of this patent is extended or adjusted under 35 U.S.C. 154(b) by 0 days.

(21) Appl. No.: 10/701,951

(22) Filed: Nov. 4, 2003

(65) Prior Publication Data

US 2004/0168331 A1 Sep. 2, 2004

(30) Foreign Application Priority Data

Nov. 4, 2002 (DE) ...................................... 202 17 059 U

(51) Int. Cl.$^7$ .......................... G01C 19/38; G01C 19/02
(52) U.S. Cl. .............................. 33/316; 33/318; 33/324
(58) Field of Search .............................. 33/355 R, 316, 33/318, 319, 324

(56) References Cited

U.S. PATENT DOCUMENTS

| 4,222,270 A | * | 9/1980 | Allen ....................... 73/504.11 |
| 4,371,921 A | * | 2/1983 | Cushman ....................... 700/9 |
| 4,512,086 A | * | 4/1985 | Galuschak et al. ........... 33/324 |
| 5,519,318 A | * | 5/1996 | Koerner et al. .............. 324/252 |

FOREIGN PATENT DOCUMENTS

| EP | 1416248 A2 | * | 5/2004 | ........... G01C/19/02 |
| JP | 2004157123 A | * | 6/2004 | ........... G01C/19/02 |

* cited by examiner

*Primary Examiner*—R Alexander Smith
(74) *Attorney, Agent, or Firm*—Shlesinger & Fitzsimmons

(57) ABSTRACT

The invention concerns a compass having an electro magnetic half-shell transformer energy transmission and opto electronic data transmission. To avoid a slipring connection during the transfer of supply voltage at least one winding on the primary half-shell is connected to a controllable input voltage source via a H-bridge circuit, and at least one secondary winding having taps is provided at the other half-shell coil.

6 Claims, 2 Drawing Sheets

Figure 1:
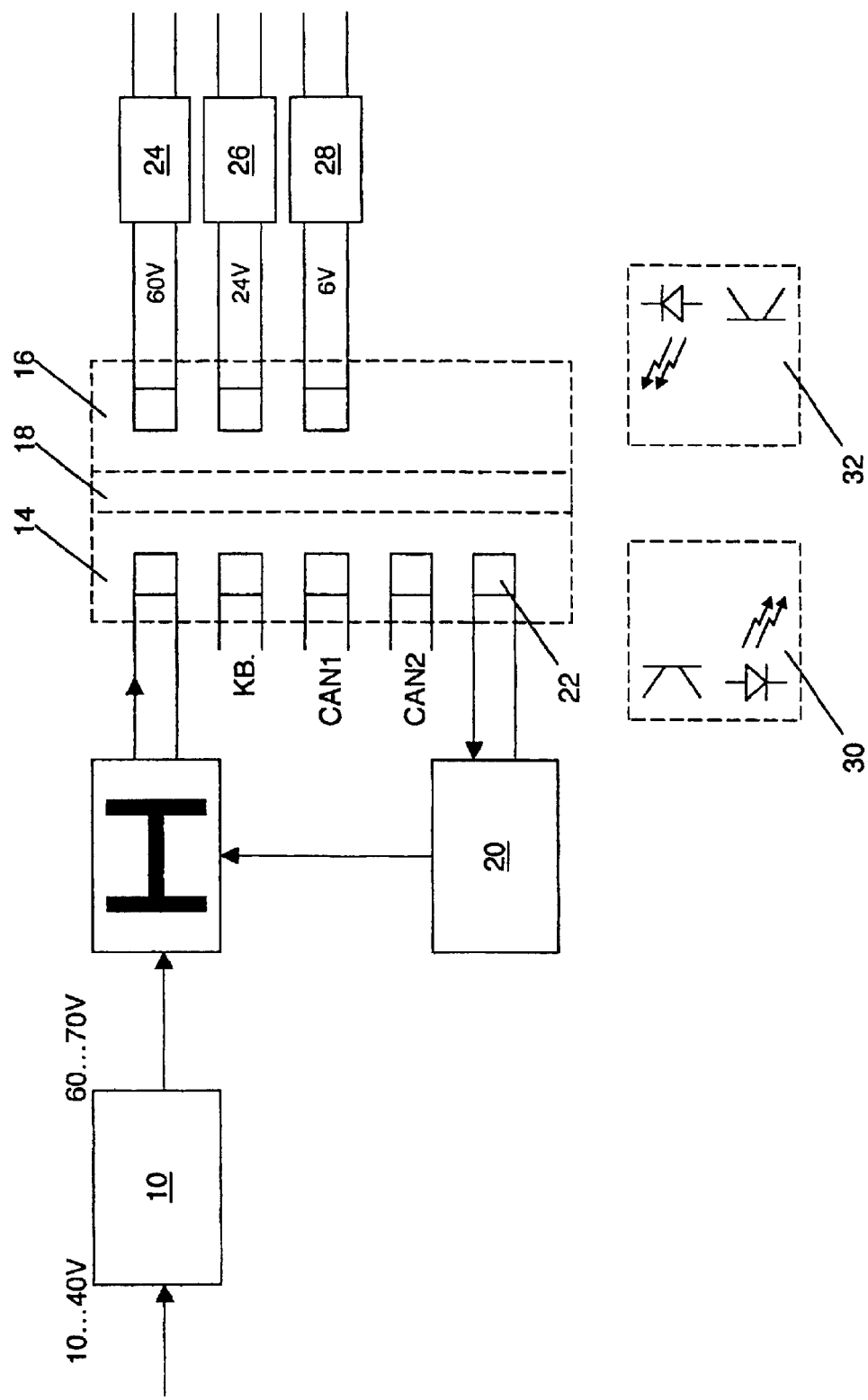

COMPASS WITH ELECTROMAGNETIC HALF-SHELL TRANSFORMER ENERGY TRANSMISSION AND OPTOELECTRONIC DATA SIGNAL TRANSMISSION

This invention refers to a compass with electromagnetic half-shell transformer energy transmission and with optoelectronic data signal transmission.

Optoelectronic transmission paths, such as those proposed by the applicant in DE 101 02 278 A1, for the transmission of energy and signals to gyro compasses are known. However, that publication—as does the entire remaining state of the art as well—proposes to feed in the supply voltage via a slip ring connection. The disadvantages inherent in slip ring connections, particularly with regard to long lifetimes, are known.

Energy transmission not using a slip ring is further described for other applications, for example, in 199 21 734 A1, in which a transverter circuit connected to a modulator circuit is employed at the primary side. However, in that publication there are no further details on the type of control or clock frequencies and operating voltages.

It is therefore the object of the present invention to avoid the disadvantages of a slip ring connection and to transfer the supply voltage without use of a slip ring. At the same time, the various supply voltages which are to be provided, partly electrically isolated, in a compass for the heating, the gyrosphere drive, and the supply to the electronics, are to be made available in the freely movable part. This means that in addition to the customary 24 V supply voltage for the heating, it is also necessary to provide a voltage of 55 V with 400 Hz to supply the gyrosphere drive. High demands regarding uniformity are made on this. In addition, 6 volts for the voltage supply to the electronics present there must also be made available in the moving unit.

In accordance with the invention this is accomplished with the features of the main claim. The subclaims represent advantageous embodiments.

Of particular advantage here is the use of a 100% energy-symmetrical rectangular signal of both polarities, which signal is generated in an H-bridge and is transmitted to the primary coil(s) to avoid magnetic leakage through direct voltage components and to avoid influencing the nearby gyroscope of the compass.

A high-precision H-bridge circuit provided with boot strap loaders and conventional drivers, for the magnetically isolated supply of the half-shell transformer, is kept constant by a closed-loop control unit with amplitude areas that are always equal and symmetrical to each other. This is accomplished with a microprocessor which monitors and activates the H-bridge circuit in accordance with the system performance requirements. Increased performance requirements are readjusted by increasing the feed-in voltage.

Through the 96% efficiency achieved in this manner, the ambient magnetization in particular will also approach zero, and a stabilization scope of 10% and more can be accomplished.

Figure 2:
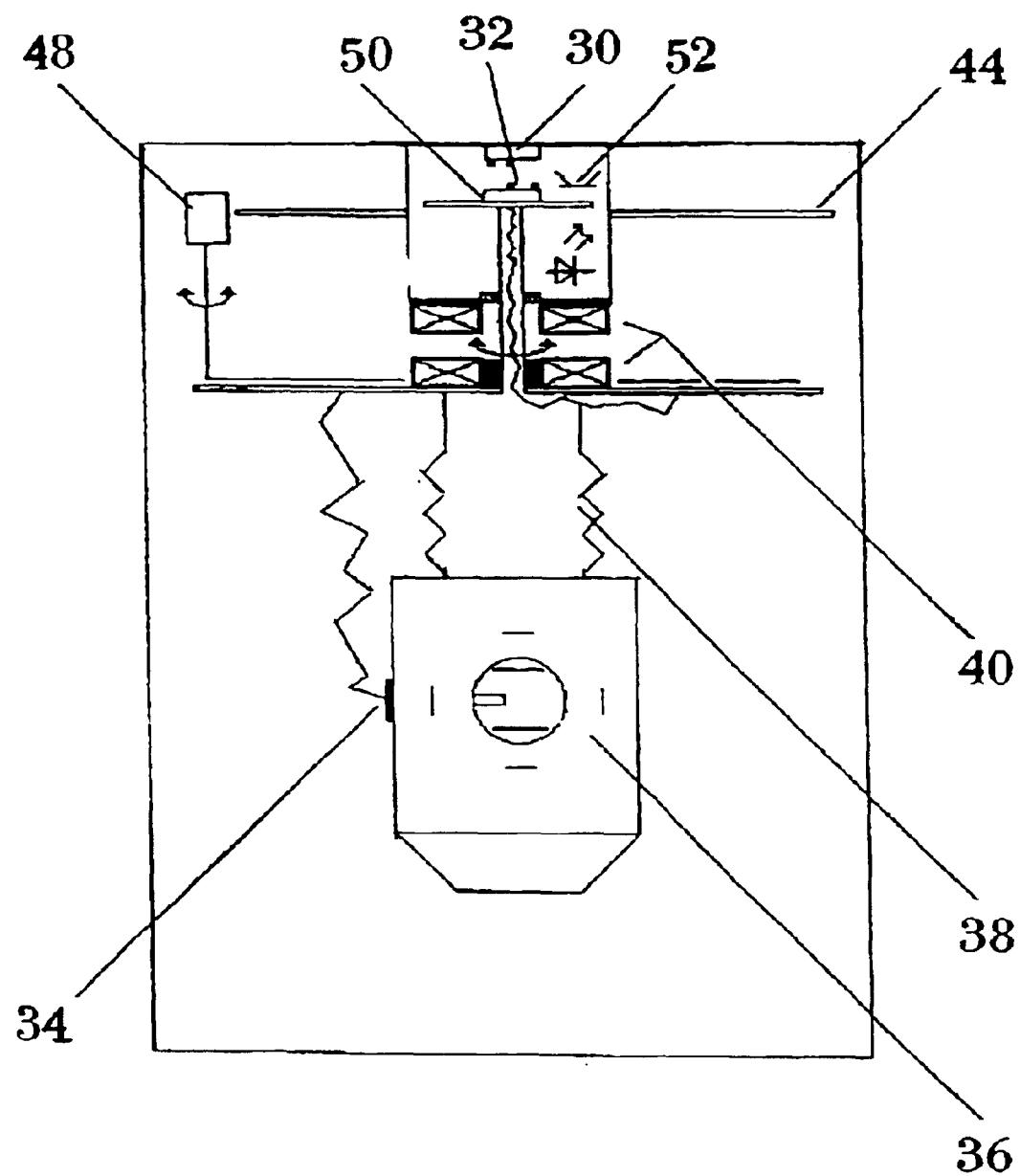

Additional advantages and features of the invention are given in the following description of a preferred embodiment on the basis of the attached schematic drawings. In the drawings:

FIG. 1 shows a schematic drawing of the components of the transmission system, and FIG. 2 shows a schematic drawing of the compass structure.

The components represented in FIG. 1 include in particular a stable voltage supply 10 which offers output voltage of approximately 60 to 70 V at an input voltage of 10 to 40 V, and a high-precision H-bridge circuit (complementary power transistors which with pulsed control create an adjustable voltage through appropriate capacitors). This H-bridge circuit is illustrated as component 12.

The half-shell transistor, suggested by the two boxes 14, 16 in broken lines with an air gap 18 in between, is supplied in a magnetically isolated manner by this component 12. This ensures a 100% energy symmetry in the rectangular-signal ratio of both polarities, to avoid magnetic losses.

In the module 20 further shown on the input side, the H-bridge circuit 12 is controlled and monitored by a microprocessor in accordance with the signals generated, particularly taking the edge steepness into account. The sensor for this closed-loop control is indicated as reference No. 22 in the input half-shell. It possesses its own taps at one of the primary coil windings.

On the primary side of the half-shell transformer, single (intertwined bifilar) coils with reference numbers 24, 26 and 28 are provided for tapping not only a 50 to 60 V voltage, but also a 24 V voltage for the heating and a 6 V voltage for the power supply to the electronics on the secondary side and to the pump. Here, in a preferred embodiment, the latter 6-V voltage is also used on the primary side of the half-shell transformer by tapping suitable windings as supply voltage for the various output interfaces of the compass (heading bus, external (output) CAN bus 1+2) with electrical isolation.

An internal CAN-bus interface, which is schematically suggested as an optoelectronic interface between the components 30 and 32 in the lower portion of the drawing, forms the optoelectronic interface of the transmission system and serves in particular for the transmission of the signal information from the compass about the vertical position, the conductance and the temperature.

It is proposed to use half-shell transformers with an outer diameter of 69 mm and an inner diameter of 22 mm, between which an air gap of 1 mm is provided, with a height per half-shell of 14 mm. Here, ferromaterial N 22 is provided as the material for the half-shells, and each respective plurality of coils is wound onto a plastic core. With a power transmission of 150 W, the result is an efficiency of approximately 96% with an ambient magnetization approaching zero.

30 KHz is selected as the clock frequency and a clock ratio of 1:1 with 100% symmetry is selected. The stabilization scope herein is 10% and the primary and secondary modules of the half-shells can be turned arbitrarily not only clockwise but also counter-clockwise.

The output voltage of a half-shell transformer is not controlled, but rather a highly-stabilized input source voltage for the H-bridge (no more than −20%) is controlled by a microprocessor module as a function of various performance requirements. This ensures that the half-shell transformer on the encoder axis of the compass works with no leakage field.

In detail, the H-bridge 12 triggers the inductance with very precise voltage pulse halves from a highly stabilized source. The frequency and the scanning ratio (exactly 50% to reaching symmetry) are kept constant even in the presence of load fluctuations, so that they do not require closed-loop control.

Here the two H-bridge halves are symmetrically triggered and the MOSFET transistors of the H-bridge are triggered with a defined clearout lag such that the residual energy from the inductances and the parasitic capacitances "clears" the halves. That means that the not negligible residual charges of the circuit are fed back directly into the feed at the switchover point, so that the efficiency is higher and the source voltage is less heavily pulse-loaded.

Not until this thorough clearing out of the residual energy of the H-bridge circuit 12 is accomplished does an inductance control with optimized flank steepness become possible. This inductance control offers the desired sharply defined rectangular signals which can clearly compensate each other—without a direct voltage component.

A Gray-code disk 50 driven with a belt drive via a stepping motor 48 is suggested merely schematically in FIG. 2. One side of the half-shell energy transformer 40 is adjoined to this disk. This encoder supplies the angular position for the follow-up control. Above this the internal CAN-bus interface is indicated by the components 30 and 32, and an optical scanning 52 of the Gray-code disk 50 is shown. In the lower region the spherical casing 36 is suspended on a pendulum joint 38 and contains the bearing liquid, the pump and the heating as well as the rotating gyrosphere maintaining its position. The heading tap of the sphere is accomplished at high frequency at approximately 50 kHz. Reference No. 34 designates a connection for all supply, control and signal lines.

The compass according to the invention, with electromagnetic half-shell transformer energy transmission 40 and with optoelectronic data transmission 30, 32, is distinguished herein by the at least one winding on the primary half-shell, which winding is connected via an H-bridge circuit to a controllable input voltage source 10. At least one secondary winding is also provided on the other half-shell coil, which secondary winding has a plurality of taps 24, 26, 28 for all voltages necessary to maintain the functions, including voltages for the power supply to the heating, the electronics and to the gyrosphere motor. In this connection, a plurality of intertwined bifilar coil windings with a different number of windings is provided on at least the secondary half-shell coil. On the input side, due to an increased energy requirement at the secondary side, in a preferred embodiment a device for controlling the voltage level of the input voltage source 10 is connected to the optical signal transmission path 30, 32 to receive control data.

On the other hand, a second control device 20 of the amplitude areas of the rectangular signal generated by the H-bridge circuit 12 is provided with a sensor 22 for detecting the generated rectangular signals at (one of) the primary windings(s) to avoid magnetic losses on the primary side, especially if there are unequal flank slopes, for the transmission of corrective control data to the H-bridge circuit. This second control device communicates with the drivers of the transistors of the H-bridge circuit 12. Moreover, the H-bridge is comprised of MOSFET transistors with—preferably—boot-strap loaders.

What is claimed is:

1. A compass with electromagnetic half-shell energy transmission and optoelectronic data transmission, characterized in that in the half-shell transformer (14,16) the at least one winding on the primary half-shell is connected via an H-bridge circuit (12) to controllable input voltage source (10), and at least one secondary winding is provided on the other half-shell coil, which secondary winding is provided with a plurality of taps for the voltage supply of the heating, the internal electronics controlling the voltage supply, and the gyrosphere motor supply.

2. The compass according to claim 1, characterized by a plurality of intertwined bifilar coil windings with a different number of windings at least on the secondary half-shell coil.

3. The compass according to claim 1, characterized in that due to an increased energy requirement at the secondary side, the control device of the voltage level of the input voltage source (10) is connected to the optical signal transmission path (30,32) to receive control data.

4. The compass according to claim 1, characterized in that the control device (20) of the amplitude areas of the rectangular signal generated by the H-bridge circuit (12) is provided with a sensor (22) for detecting the generated rectangular signals at (one of) the primary winding(s) to avoid magnetic losses on the primary side, especially if there are unequal flank slopes, for the transmission of corrective control data to the H-bridge circuit.

5. The compass according to claim 4, characterized in that the H-bridge is provided with MOSFET transistors with bootstrap loaders.

6. The compass according to claim 1, characterized in that an encoder is provided on the half-shell transformer for detecting the angular position.

* * * * *